United States Patent [19]
Gamm

[11] Patent Number: 5,471,465
[45] Date of Patent: Nov. 28, 1995

[54] EXCHANGE HAVING OVERDIMENSIONED DIGITAL SWITCHING NETWORK

[75] Inventor: Bernhard Gamm, Strasse, Germany

[73] Assignee: Alcatel N.V., Amsterdam, Netherlands

[21] Appl. No.: 81,807

[22] Filed: Jun. 23, 1993

[30] Foreign Application Priority Data

Jun. 27, 1992 [DE] Germany .......................... 42 21 188.3

[51] Int. Cl.$^6$ .................................................. H04Q 11/04
[52] U.S. Cl. ........................... 370/58.1; 370/60.1; 370/84
[58] Field of Search ........................... 370/58.1, 60, 60.1, 370/94.1, 84; 379/219, 242

[56] References Cited

U.S. PATENT DOCUMENTS

| | | | |
|---|---|---|---|
| 4,201,889 | 5/1980 | Lawrence et al. | 370/68 |
| 4,201,890 | 5/1980 | Lawrence et al. | 370/68 |
| 4,201,891 | 5/1980 | Lawrence et al. | 370/58 |
| 4,811,336 | 3/1989 | van Baardwijk et al. | 370/63 |
| 5,091,093 | 2/1992 | Schrodi | 370/58.1 |
| 5,105,292 | 4/1992 | Le Roy et al. | 370/50 X |
| 5,109,378 | 4/1992 | Proctor et al. | 370/58.1 |
| 5,197,097 | 3/1993 | Takahashi et al. | 370/60 X |
| 5,278,689 | 1/1994 | Gitlin et al. | 370/94.1 |
| 5,321,691 | 6/1994 | Pashan | 370/58.3 |
| 5,343,467 | 8/1994 | Wöhr | 370/59 |

FOREIGN PATENT DOCUMENTS

| | | | |
|---|---|---|---|
| 3908838 | 10/1989 | Germany | H04L 12/56 |
| 4004396 | 8/1991 | Germany | H04L 12/56 |
| 4010283 | 10/1991 | Germany | H04Q 3/52 |
| 4010146 | 10/1991 | Germany | H04L 12/56 |

OTHER PUBLICATIONS

Coupling Matrix for the Spatial Exchange of 8×280 Mbit/s by Michael Schumann, Herbert Pophal, pp. 516–519—Vermittlungstecnik, bd 35, H. 8, 1982.

Flexnode—a digital cross–connect system.Bergkvist, Persson, Rendel, Roker, Schroter. pp. 702–710. In: ntz, Bd. 44, H.10, 1991—NKU 2000.

Intermediate highway for the spatial transmission of 8×280 Mbit/s, by Michael Schumann, Joachim Vathke, pp. 520–522. In:ntz, Bd. 35, H.8, 1982—Vermittlungstechnik.

"System 12—Review of the Fundamental Concepts", R. Van Malderen, Electrical Communications, vol. 59, No. 1/2, 1985 pp. 20–28.

"Prospecture Views on the Alcatel Broadband Architecture, by Alcatel" by D. Becker, et al., pp. 147–155, Electrical Communications, vol. 64, No. 2/3, 1990.

"Alcatel ATM Switch Fabric and its Properties", by D. Bottle, et al, pp. 156–165, Electrical Communications, vol. 64, No. 2/3, 1990.

"System 12 Dual Switch Port" by W. Frank et al, Electrical Communications, vol. 59, No. 1/2, pp. 54–59, 1985.

*Primary Examiner*—Douglas W. Olms
*Assistant Examiner*—Russell W. Blum
*Attorney, Agent, or Firm*—Ware, Fressola, Van Der Sluys & Adolphson

[57] ABSTRACT

An exchange having a digital switching network and peripheral units connected thereto, the peripheral units serving to interface with subscribers, other exchanges, or maintenance devices or to perform other functions, and the switching network serving to establish arbitrary traffic relations between the units, particularly to establish switched connections between attached subscribers or exchanges, characterized in that at the interface to the peripheral units, the digital switching network is overdimensioned more than twofold. The switching network may advantageously be an ATM switching network, and the interface between the switching network and the peripheral units may have narrow-band and broadband inputs and outputs.

5 Claims, 6 Drawing Sheets

FIG. IB
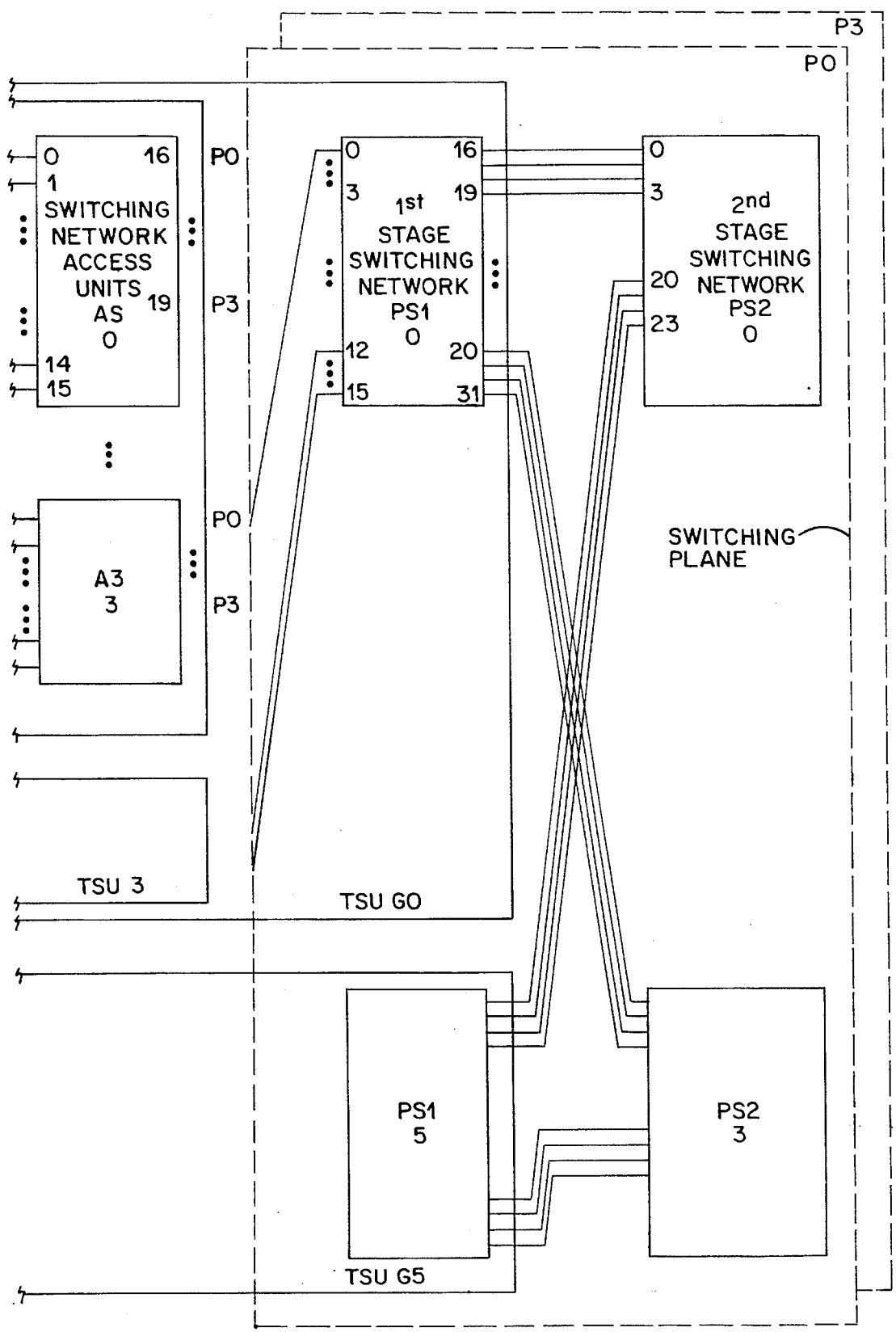

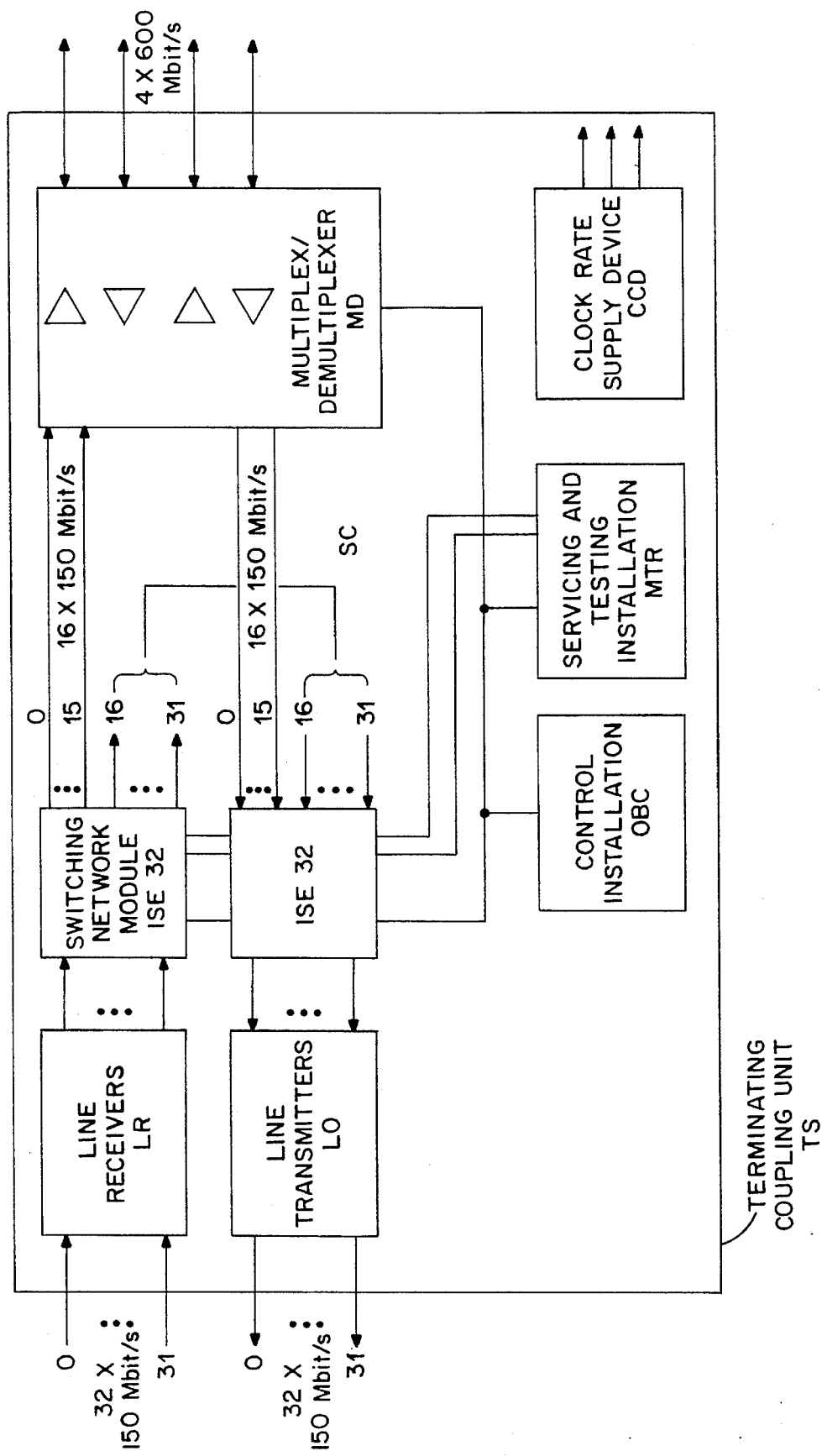

EXCHANGE HAVING OVERDIMENSIONED DIGITAL SWITCHING NETWORK

TECHNICAL FIELD

The invention concerns an exchange with a digital switching network and connected peripheral units that serve to interface with subscribers, other exchanges, maintenance devices or to perform other functions.

BACKGROUND OF THE INVENTION

Possibly all exchanges that are presently built have this basic construction. Such an exchange is described in "SYSTEM 12—Preview of the Fundamental Concept", R. Van Malderen, Electrical Communications, volume 59, no. 1/2, 1985, p. 20–28.

The primary task of the switching network consists in establishing connections between any two subscriber terminals. Each of these subscriber terminals may be connected to a peripheral unit of this exchange, or to another exchange, which is then connected to another peripheral unit.

For practical reasons, all transitions between a peripheral unit and the digital switching network are performed in the same way. The capacity of such a transition is coupled to the capacity of a conventional multiplex connection. In the above mentioned example of a switching network according to SYSTEM 12, 60 connections of 64 kbit/s each can be transmitted in both directions between a peripheral unit and the digital switching network. To this are added two times two special channels of 64 kbit/s each as well.

Additional transmission capacity is required in a switching network, beyond the above described incoming and outgoing traffic, for the connection of subscriber terminals to each other. It serves the most varied purposes, e.g. to signal when a connection is established or terminated, the connection of the controls of the peripheral units to each other or to a central control unit, the distribution of clock rate or tones, or the updating of data or control programs.

The switching network is also used in part for these additional purposes, in part the exchange contains separate networks for this purpose. In the above mentioned SYSTEM 12 example, a distribution network for clock rate and tones is provided; incidentally, only the digital switching network is available for internal communication (see FIG. 3 on page 21 of the above mentioned article).

Furthermore, in all exchanges built in this way, the increasingly required possibility of establishing N-channel connections can only be achieved at great expense, because internal blockage takes place very quickly when the switching network has to establish several synchronous connections.

SUMMARY OF THE INVENTION

In that instance, the invention provides an exchange comprising a digital switching network and peripheral units connected thereto, the peripheral units serving to interface with subscribers, other exchanges, or maintenance devices or to perform other functions, and the switching network serving to establish arbitrary traffic relations between the units, particularly to establish switched connections between attached subscribers or exchanges, characterized in that at the interface to the peripheral units, the digital switching network is overdimensioned more than twofold.

The invention makes use of the fact that for practical reasons, the capacity of the peripheral units can never use the technologically required peak limit, while the switching network is not limited by such a restriction. The switching network can be built, without additional cost, in a way so that the technologically required peak capacity becomes available. The capacity that is not needed for the actual exchange activity can then be used for the control data traffic leaving the peripheral units, or for signalization. The internal task elaboration, e.g. the establishment of a connection, can clearly be accelerated in this way. No other traffic considerations are involved.

With a heavily overdimensioned switching network (clearly more than just a duplication), the danger of internal blocking is very small. This can be taken into consideration when dimensioning the switching network, so that only the transition to the peripheral units is clearly overdimensioned, but not the central coupling steps.

Advantageous configurations-of the invention can be found in the subclaims.

The overdimensioning of the switching network is preferably made by using a higher clock rate in the switching network, as opposed to the peripheral units. Even without changing the wiring in existing switching networks, the transmission speed in the individual lines can be increased from 2 or 4 Mbit/s to 32 Mbit/s. An increase to 155 Mbit/s can also be achieved with special adaptation for higher frequencies, e.g. by using optical fibers. Standardized transmission speeds are preferable, so that the peripheral units can be physically separated from the remaining exchange with the help of standard transmission devices.

A particularly advantageous configuration possibility, from the economical point of view, consists in constructing a narrow-band exchange with the narrow-band peripheral units developed for that purpose as the peripheral units, and with a broadband switching network, particularly an asynchronous transfer mode (ATM) switching network. It is then only necessary to develop a suitable transition element between the switching network and the peripheral units. The peripheral units themselves could be kept, including the software developed for them. In addition, this creates a mass market for ATM switching network components, which favors the economical introduction of ATM. Since such a narrow-band exchange already contains an ATM switching network, it can easily be completed or converted for ATM applications with peripheral ATM units.

Switching elements having both narrow-band and broadband inputs and outputs, are proposed as transition elements between the switching network and the peripheral units.

BRIEF DESCRIPTION OF THE DRAWINGS

In the following, the invention is explained in more detail with the aid of a configuration example and the enclosed drawings.

FIG. 3 is a block diagram of another unit of the exchange in FIG. 1.

BEST MODE FOR CARRYING OUT THE INVENTION

Figure 1:
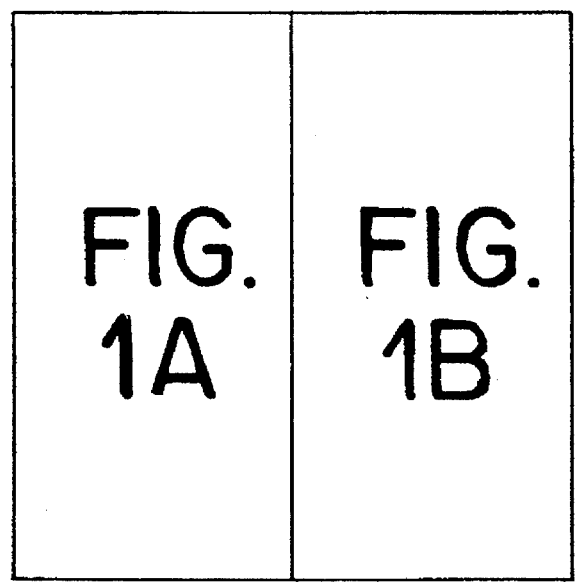
FIG. 1 is a key to the construction of FIGS. 1A and 1B, which show the basic construction of an exchange according to the invention.
Figure 1A:
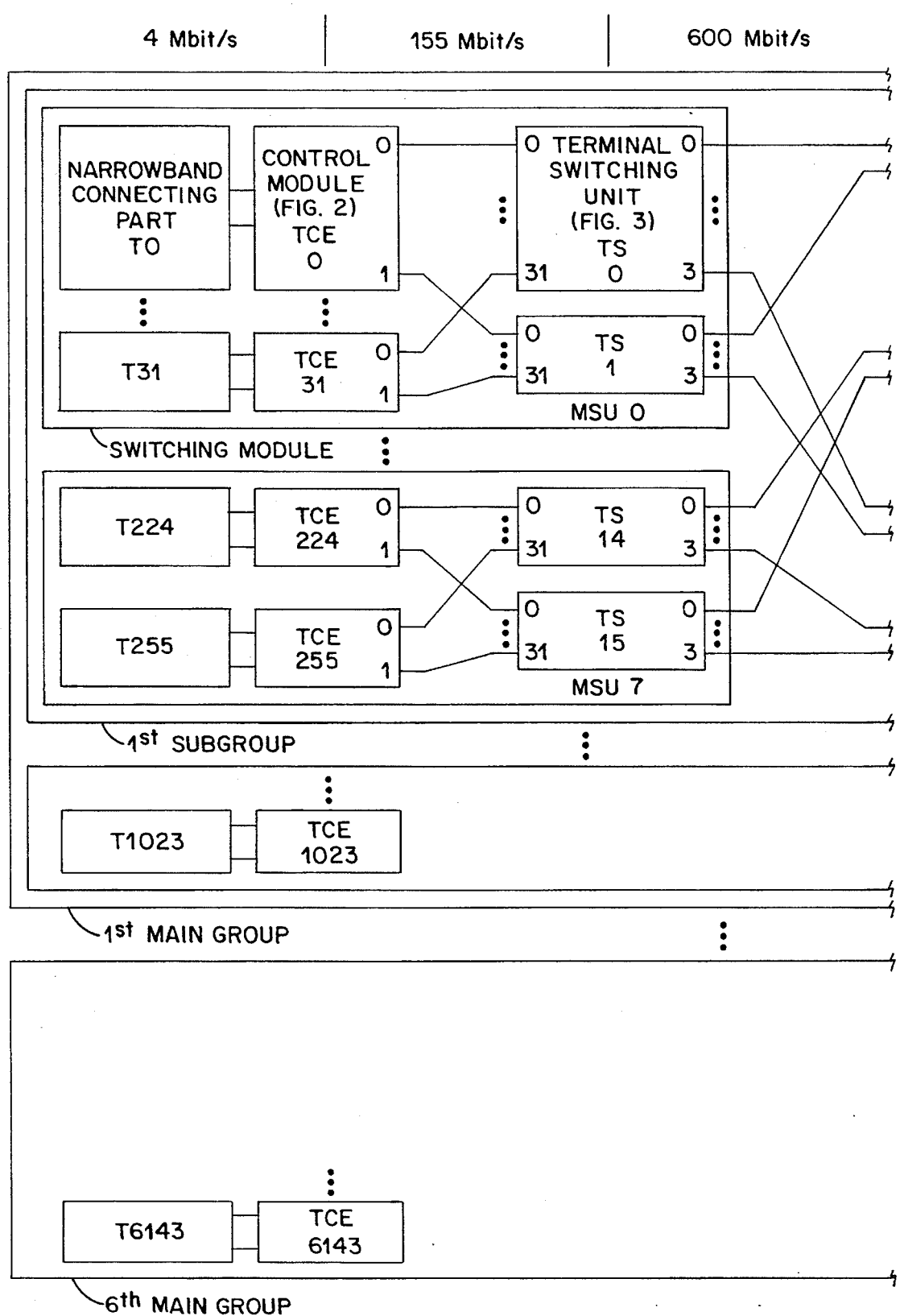

FIGS. 1A and 1B show a complete exchange. The illustration dosely follows the representation of the above named article by R. Van Malderen. The complete assembly is shown, as is customary in such representations. Experts in the art know which parts can be omitted with fewer connections or less traffic density. The lines leading to the outside are not shown in this illustration.

The core of the exchange is a main coupling field consisting of four planes P0 . . . , P3, which detects the actual switching task. The main coupling field is built in two stages. Each of the four planes in the first stage contains six switching network modules PS10, . . . , PS15. In each plane, the six switching network modules of the first stage are connected to each other by four switching network modules PS20, . . . , PS23 of the second stage.

Except for the second stage of the main coupling field, the entire exchange is divided into six main groups TSUG0, . . . , TSUG5. Such a main group consists of one each of the six switching network modules PS10, . . . , PS15 of the first stage, with the corresponding switching network modules, and four subgroups TSU0, . . . , TSU3 of the other planes.

Each of the four subgroups—FIG. 1A and 1B shows subgroup TSU0 of main group TSUG0 in detail—has four switching network access units AS0, . . . , AS3 and eight switching modules MSU0, . . . , MSU7. Like every other switching module, switching module MSU0 consists of two terminating coupling units TS0 and TS1 and 32 connection modules, each consisting of one connecting part T0, . . . , T31 and one module control unit TCE0.

Except for the terminating coupling units TS0, . . . and the missing middle stage in the main coupling field, this corresponds to the arrangement in an exchange according to SYSTEM 12, as represented in the article mentioned in the beginning. The same exchange is also described in U.S. Pat. Nos. 4,201,889, 4,201,890 and 4,201,891.

Deviating from the known exchange according to SYSTEM 12, in this instance, however, the operation is at different clock rates and therefore different transmission speeds.

The connecting parts T0, . . . , T6143, and the module control units TCE0, . . . , TCE6143 operate at 4 Mbit/s, as in SYSTEM 12. The connecting parts, in which the largest portion of the development cost is invested, including the greatest part of the software, can be used without change.

A transition from 4 Mbit/s to 155 Mbit/s, and vice versa, takes place in the module control units. The number of incoming and outgoing lines is the same on both sides, namely two. At 155 Mbit/s, the capacity on the broadband side is clearly overdimensioned. This overdimensioning enables the broadband side to accept many signalization tasks concerning the internal operation, with no detriment of any kind to the actual exchange task. Even the exchange of channel bundles (n×64 kbit/s) is possible without danger of blockage.

A further increase in the transmission speed, from 155 Mbit/s to 600 Mbit/s, takes place in the terminating coupling units TS0, . . . , in conjunction with a transition to optical connection lines. This transition is linked to a traffic concentration from 32 input lines to four output lines.

Further concentration up to the second stage of the switching network is possible, without the threat of local blockages.

In this example, the broadband side is constructed with ATM technology. The ATM concept is used here in its somewhat more original meaning.

In particular, special standardization of the cell length is not required. Of special advantage, even if not mandatory, is the use of different length ATM-cells in the switching network. The shortest possible length is used for switching a connection with 64 kbit/s; for data packets, particularly control data packets, the length of the cells is adapted to the data packets.

The switching network modules AS0, . . . , AS3; PS10, . . . , PS15 and PS20, . . . , PS23 each have 32 inputs and 32 outputs. The realization is described in "Electrical Communications", volume 64, number 2/3, 1990 by D. Becker et al, p. 147–155, "Prospective Views on the Alcatel Broadband Architecture", and by D. Böttle et at, p. 156–165, "Alcatel ATM Switch Fabric and Its Properties". These switching network units are called switching modules or basic switching modules. These switching network modules are also described in U.S. Pat. No. 5,091,903.

Figure 2:
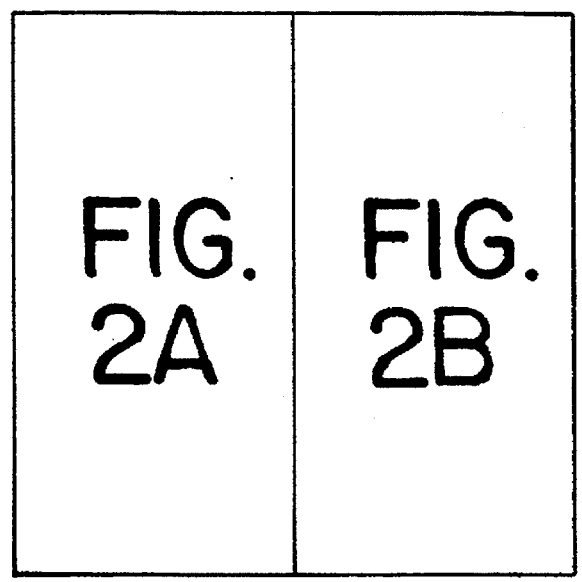
FIG. 2 is a key to the construction of FIGS. 2A and 2B, which are a block diagram of a switching dement with narrow-band and broadband inputs and outputs for use in the exchange of FIG. 1.

The construction of a module control unit TCE will now be described by means of FIGS. 2A and 2B. The module control unit TCE has basically the same construction as the module control unit in SYSTEM 12 cited several times (e.g. according to FIG. 3 of the R. Van Malderen article). The main part is an access unit BTER, to which a control part with a control processor CC and a corresponding memory CMEM have been added. In addition, FIG. 2 shows a voltage converter MBC, which transforms the given operating voltage of 48 V or 60 V to the required –5 V voltage grounded on one side.

In principle, the access unit BTER is an exchange. In this instance it has two narrow-band inputs with narrow-band input circuits IS0 and IS1 and a corresponding narrow-band input control circuit ICS, and two narrow-band outputs with narrow-band output circuits OS0 and OS1 and a corresponding narrow-band output control circuit OCS, as well as two broadband inputs with broadband input circuits IB0 and IB1 and a corresponding broadband input control circuit ICB, and two broadband outputs with broadband output circuits OB0 and OB1, and a corresponding broadband output control circuit OCB.

The inputs and outputs are interconnected with the help of data storage MEM. Data can be entered from every input circuit into every memory element of data storage MEM; in turn, data can be read out from every memory element to every output circuit. The required multiplexer and demultiplexer functions are not shown in FIGS. 2A and 2B. Altogether, it is the same basic construction as in FIG. 7 of the cited article by D. Böttle et at., or in FIG. 5 of the cited U.S. Pat. No. 5,091,903. Incidentally, this basic construction and the necessary detail configurations are known to every professional in this field.

In this instance, the broadband inputs and outputs are ATM-inputs and outputs, like in the above named examples, while the narrow-band inputs and outputs are in principle like those in SYSTEM 12.

To build the exchange of SYSTEM 12, an article by W. Frank et al. is pointed out, which appeared in 1985 in "Electrical Communications", volume 59, number 1/2, p. 54–59, under the title "System 12—Dual Switch Port". The U.S. patents cited for SYSTEM 12 also describe the exchange. Deviating from the realization in SYSTEM 12, in this instance a central data storage is used, not a number of data storages assigned to the individual outputs. If, in this instance, predetermined memory elements of data storage MEM are assigned to the two narrow-band output circuits OS0 and OS1, synchronization is then reestablished.

On the narrow-band side, the flow of data between the input circuits, the data storage and the output circuits takes place through 16-bit wide, parallel transmitting data words.

64-bit data words are used on the broadband side. The 16 bits on the narrow-band side correspond to a time slot in the time multiplex used there. The 64 bits on the broadband side correspond to one each ATM data packet.

A path selection control RC is coupled to data storage MEM. It provides a packet header to each data word coming from the narrow-band input circuits, which is needed for the exchange in the ATM-switching network and the assignment in the module control unit on the output side. One packet header is uniquely assigned to each time slot in each of the two narrow-band input circuits during the completion of the connection. In the reverse, each packet header coming from the broadband input circuits is uniquely assigned to a time slot of one of the two narrow-band output circuits. Part of the 64 bits in a broadband data word remain unused.

The access unit BTER further contains a clock rate generator C1, which produces clock rates of 8 kHz, 3 MHz, 8 MHz and 155 MHz. These clock rates are synchronized with externally supplied clock rates of 8 MHz, 19.44 MHz and a frame pulse FRAME. For reasons of reliability, the externally supplied clock rates are duplicated. The indicated frequencies are partly rounded off (also differently than with 150 Mbit/s and 155 Mbit/s).

The basic SYSTEM 12-type exchange also has the possibility of switching data packets, and to let the module control units communicate with each other through data packets.

These possibilities are also provided in this instance. For that purpose, which also serves to build the connection up and terminate it, a narrow-band control input and output PS, a broadband control input and output PB and a corresponding path guidance device PR are included. These are connected to each other and to the path selection control RC by a 64-bit wide bus. The control inputs and outputs PS and PB are connected to the corresponding input and output control circuits ICS and OCS, or ICB and OCB, through 16-bit or 64-bit wide parallel data lines. In addition, the path guidance device PR is connected to the control processor CC and its memory CMEM through a 32-bit wide bus.

On the narrow-band side, data packets are transmitted as a whole, including the packet header, in successive time slots pertaining to the same transmission channel. Data packets arriving in one of the two narrow-band input circuits IS0 and IS1 are recognized as such by the corresponding input circuit controls ICS, and, supported by control processor CC, are entered into the memory CMEM by the narrow-band control input and output PS and the path guidance device PR. In the reverse, data packets intended for the narrow-band side are read out from memory CMEM by the path guidance device PR, the narrow-band control input and output PS and the narrow-band output circuit control OCS through the provided narrow-band output circuit OS0 or OS1. The exchange of data packets between one of the broadband input circuits IB0 and IB1 and memory CMEM, and between the latter and one of the broadband output circuits OB0 and OB1, takes place in the same way. Only the data format is different.

Data packets that are not intended for this module control unit, are first entered from the one side into the memory CMEM, and from there are read out to the other side. Both take place as described above.

Notable is the fact that the path guidance device PR is supplied by the clock rate generator C1 at the rate of 155 MHz, and from the outside by timing marks TSTP. The timing marks, which are also supplied in duplicate, are allocated to the data packets inside the switching network.

Finally, FIG. 3 describes the construction of a terminating coupling unit TS. The terminating coupling unit TS has two switching network modules ISE32, a muldex (multiplexer-demultiplexer) MD, a control unit OBC, a service and test installation MTR and a clock rate supply installation CCD. In addition, line receivers LR and line transmitters LD as well as jumpers SC are provided.

Each of the two switching network modules ISE32 has 32 inputs and 32 outputs. Each switching network module corresponds to one of the two directions. In principle, the switching network modules do not differ from the switching network modules of the first or the second stage, PS10, . . . , PS15; PS20, . . . , PS23 and the access switching network modules AS0, . . . , AS3.

A concentration of 32 input lines to 16 output lines with 150 Mbit/s each takes place in the direction from the periphery to the switching network. In the multiplexing part of the muldex MD, the traffic is rerouted from 16-times 150 Mbit/s to 4-times 600 Mbit/s. In the inverse direction, the demultiplexer part of the muldex MD reroutes from 4-times 600 Mbit/s to 16-times 150 Mbit/s, and in the corresponding switching network module ISE32 it distributes from 16 input lines to 32 output lines.

On the 600 Mbit/s side, the muldex MD additionally joins the two directions in the same line, and also converts between electrical signals in the muldex and optical signals in the lines on this side.

Figure 2A:
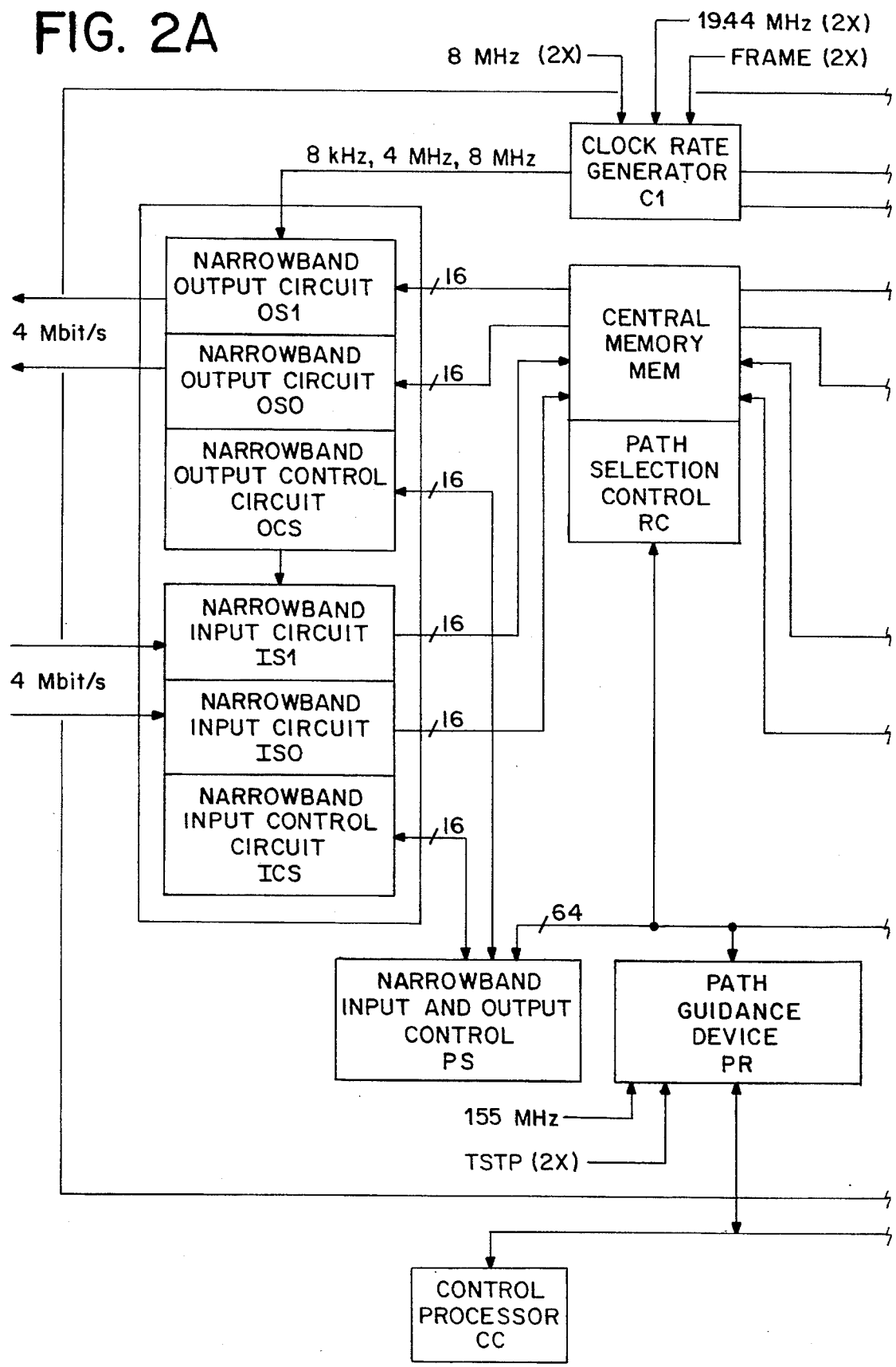
Figure 2B:
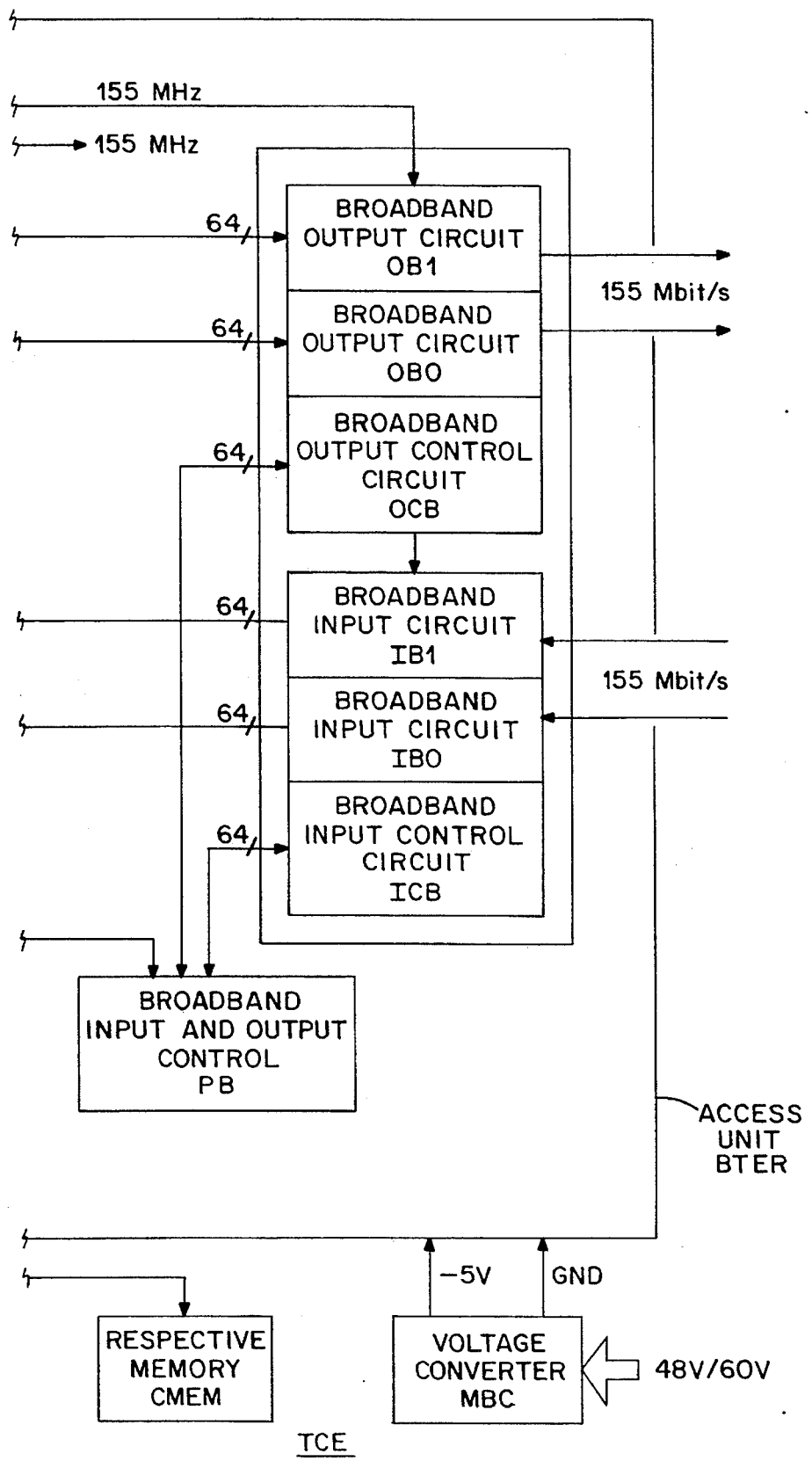

It should be pointed out here that the two directions are explicitly indicated in FIGS. 2A, 2B and 3, while a connection is drawn in FIGS. 1A and 1B for both directions, independently of whether these are conducted in a common line or in different lines. This is insignificant in principle.

The 16 outputs or inputs of both switching network modules ISE32 that are still free, may be connected by jumpers SC, thus offering an early reversing possibility.

Line receivers LR and line transmitters LD are used if required by the length of the lines to the connected module control units.

Control of terminating coupling unit TS takes place with control installation OBC in the essentially known manner. The service and test installation MTR, as well as the line receivers LR, the line transmitters LD and the muldex MD are constructed in the known manner and are not specific to the invention.

The use of terminating coupling units TS is not essential to the invention. Switching network structures without such terminating coupling units could be used, and other switching network structures are also basically possible.

What is claimed is:

1. An exchange comprising a digital switching network (TS, AS, PS) and peripheral units (T0, . . . , T6143), said peripheral units being connected to said switching network by switching elements, said peripheral units serving to interface with subscribers, other exchanges, or maintenance devices, and said switching network serving to establish arbitrary traffic relations between said peripheral units, particularly to establish switched connections between attached subscribers or exchanges, characterized in that at the switching element (TCE0, . . . , TCE6143) connected between at least one of said peripheral units and said switching network, the maximum traffic rate between the switching element and said switching network is more than twice the maximum traffic rate between said at least one of said peripheral units and the switching element.

2. An exchange as claimed in claim 1, characterized in that the difference in traffic rates between the switching element and said switching network and between said at least one of said peripheral units and the switching element is provided by a higher clock rate in said switching network than that in said at least one of said peripheral units.

3. An exchange as claimed in claim 2, characterized in that said switching network is a broadband switching network, and that said peripheral units are narrow-band units.

4. An exchange as claimed in claim 3, characterized in that said switching network is an ATM switching network.

5. An exchange as claimed in claim 3, characterized in that said switching elements (TCE) have narrow-band (IS0, IS1; OS0, OS1) and broadband (IB0, IB1; OB0, OB1) inputs and outputs.

* * * * *

UNITED STATES PATENT AND TRADEMARK OFFICE
CERTIFICATE OF CORRECTION

PATENT NO. : 5,471,465

DATED : November 28, 1995

INVENTOR(S) : Gamm

It is certified that error appears in the above-indentified patent and that said Letters Patent is hereby corrected as shown below:

```
On the title page item [56],
     replace "4,811,336" with --4,811,335--.
```

Signed and Sealed this

Thirtieth Day of April, 1996

Attest:

BRUCE LEHMAN

Attesting Officer     Commissioner of Patents and Trademarks